May 22, 1928.  1,670,685

E. S. MARKS

TIRE GAUGE

Filed June 18, 1925

INVENTOR.
Edward S. Marks
BY
Parsons & Bodell
ATTORNEYS.

Patented May 22, 1928.

1,670,685

UNITED STATES PATENT OFFICE.

EDWARD S. MARKS, OF SYRACUSE, NEW YORK.

TIRE GAUGE.

Application filed June 18, 1925. Serial No. 37,892.

This invention relates to tire gauges, and has for its object a tire gauge which will indicate the pressure within the tire by being pressed against the outer wall of the tire.

This invention consists in the novel features and in the combinations and constructions hereinafter set forth and claimed.

In describing this invention reference is had to the accompanying drawings in which like characters designate corresponding parts in all the views.

Figure 1:
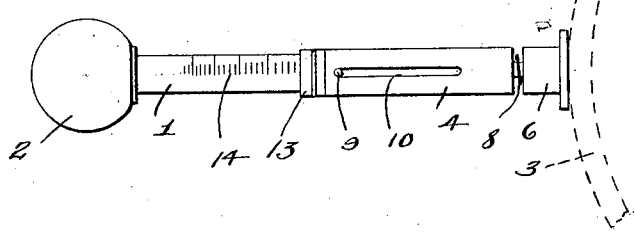
Figure 1 is a side elevation of this tire gauge, showing it as initially applied to the tire, before being pressed against the tire.

This tire gauge comprises pressure members, and means for supporting and pressing them against the tire, said members being movable as a unit relatively to said means, and also relatively to each other, and means dependent upon the movement of said members as a unit before the relative movement between them is limited, for indicating the pressure of the tire.

As here illustrated this gauge comprises a body or handle a pressure member slidably mounted relatively to the handle, a second pressure member slidably mounted relatively to the former member, both members being arranged to engage the tire, and one being of greater area, that is, having a pressure face of greater area than the other, a spring interposed between said members, a spring interposed between the handle and the first member, and means for indicating the movement of the first member relatively to the handle.

1 designates the handle or body which is in the form of a rod or stem formed with a suitable knob 2 by means of which the gauge can be conveniently pressed against the side wall of a tire 3.

4 is one of the pressure members it being here shown as tubular in form, and as telescopically or slidably mounted upon the body 1, the member 4 having a stem 5 at its outer end.

6 is the second pressure member slidably mounted on the stem 5, and having its outer or pressure face flush with the end of the stem, or arranged to bear on the tire around the end of the stem.

7 is a spring interposed between the handle 1 and the pressure member 4, in the tubular portion of the handle 1.

8 is a spring interposed between the members 4 and 6, normally holding them spaced apart.

The member 4 is secured against detachment from the handle 1 by a pin 9 on the handle and extending into a lengthwise slot 10 in the member 4, and the member 6 is similarly connected by a pin and slot 11 to the stem 5.

An indicator 13 is slidably mounted on the handle 1 along calibrations 14 on the handle 1, this indicator 13 being actuated by the sliding of the member 4 along the handle 1.

Figure 2:
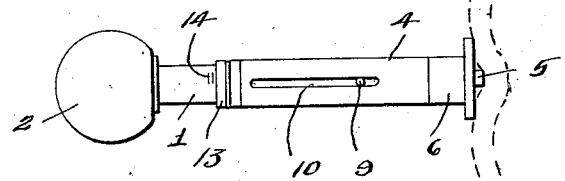
Figure 2 is a view similar to Fig. 1, showing it as being pressed to the tire, before the reading is taken.
Figure 3:
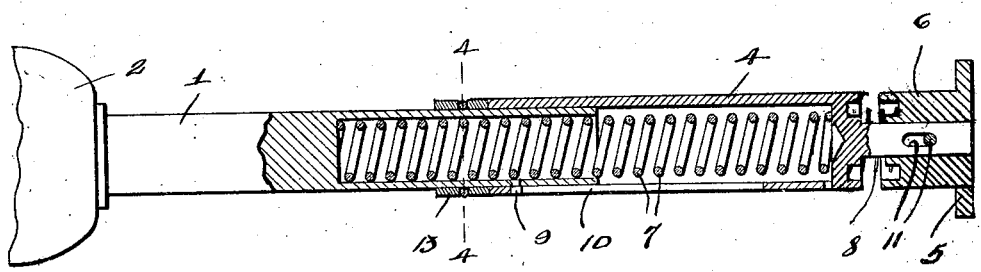
Figure 3 is a longitudinal sectional view of this tire gauge.
Figure 4:
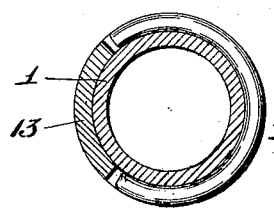
Figure 4 is a transverse sectional view on line 4—4, Fig. 3.

In operation the gauge is pressed against the side wall of the tire with the face of the member 6 and the end of the stem 5 engaging the tire. As the pressure is applied to the knob 2, the spring 7 is compressed and the force thereof applied to the member 4, pressing the stem 5 into the side wall of the tire as shown in Fig. 2, and also through the spring 8 pressing the member 6 which has a greater area than the stem 5 against the tire so that it makes a depression in the tire. The pressure is applied until the member 6 is compressed against the spring 8 to close the gap between the members 4 and 6.

Before this gap closes both members 4 and 6 will move as a unit thus sliding the member 13 along the calibrations on the handle 1, and during such movement the gap between the members 4 and 6 is gradually being taken up. When this gap is closed the operator discontinues pressing the instrument against the tire and removes the tire gauge from the tire, so that the spring reacts, but leaves the indicator where it has been pushed when pressed against the tire. A reading may be taken on the calibrations. The operation of the gauge depends upon the amount of bodily movement of the two pressure members as a unit during the time that the gap is being closed between them.

This gauge is particularly advantageous when used with balloon tires, as a car owner is naturally disinclined to take the pressure of his tires or to postpone the task, owing to the facts that the caps, etc., on the valve stems must be removed, By my gauge he can instantly determine by pressing the gauge against the tire whether or not the tires need more air, and having once determined that the tires do need air, will fill the tires with air at the nearest station.

What I claim is:—

1. In a tire gauge, a body, a member slidable on the body, and having an engaging end for pressing against the tire, a spring interposed between the body and said member for resisting the relative sliding movement of the body and the member, a second member arranged to press against the tire and being movable relatively to the first member, a spring interposed between the members for resisting relative movement of said members, and means for indicating the amount of relative movement of the body and said members.

2. In a tire gauge, the combination of two members arranged to engage the tire and having movement relatively to each other, and a spring interposed between said members for resisting such movement, a handle, a spring interposed between the handle and one of said members, and indicator means actuated by the movement of said members relatively to each other and the handle.

3. In a tire gauge, the combination of three parts arranged in axial alinement, said parts comprising a handle, a pressure member slidable on the handle, and a second pressure member slidable on the first pressure member, a spring interposed between said members, and a spring interposed between the handle and the first member, means for indicating the amount of relative movement of the handle and the first member when the gap between said members is closed, during the relative movement of said members.

4. A gauge, comprising a handle, a pressure member mounted to slide axially of the handle, a spring interposed between the handle and said member, said member having a stem at its outer end, a second member mounted on the stem, a spring interposed between said members, and an indicator operated by the movement of the first member along the handle, when the space between said members is taken up.

5. A tire gauge for taking the pressure of the tire by thrusting it against the tire, comprising two members of different area arranged to be compressed into the tire, and indicator means operated by the movement of said members as a unit, and the movements of said members relatively to each other.

6. A tire gauge, comprising a body, pressure members arranged to press into the tire and mounted to move relatively to the body as a unit and relatively to each other, a spring between the body and one of the members, and means for indicating the relative movement of the body and said members when the relative movement between said members is limited.

7. A tire gauge, comprising two concentrically arranged members having pressure faces of different areas, one member being slidable relatively to the other, and a spring for resisting such sliding movement, a handle on which the other member slides, and a spring for resisting relative sliding movement of the handle and the member slidable thereon, and indicator means operated by the movement of said members relatively to each other and the handle.

8. A tire gauge, comprising members for coacting with the walls of a tire to indent different distances into the same and pressure indicating means operable by the movement of said members while indenting the tire wall.

In testimony whereof, I have hereunto signed my name, at Syracuse, in the county of Onondaga, and State of New York, this 26th day of May, 1925.

EDWARD S. MARKS.